United States Patent [19]

Kraft

[11] Patent Number: 5,119,125
[45] Date of Patent: Jun. 2, 1992

[54] PROCESS FOR THE PREPARATION OF PHOTOGRAPHIC COLOR COPIES

[75] Inventor: Walter Kraft, Zürich, Switzerland

[73] Assignee: Gretag Systems, Inc., Bothell, Wash.

[21] Appl. No.: 755,095

[22] Filed: Sep. 5, 1991

[30] Foreign Application Priority Data

Sep. 10, 1990 [CH] Switzerland ............... 2930/90

[51] Int. Cl.$^5$ .................................... G03B 27/80
[52] U.S. Cl. ................................. 355/38; 355/77
[58] Field of Search .............. 355/32, 35, 38, 77; 352/404, 444; 358/76, 80, 133

[56] References Cited

U.S. PATENT DOCUMENTS

| | | | |
|---|---|---|---|
| 4,154,523 | 5/1974 | Rising et al. | 355/38 |
| 4,159,174 | 6/1979 | Rising | 355/38 |
| 4,873,546 | 10/1989 | Zahn et al. | 355/38 |
| 4,884,102 | 11/1989 | Terashita | 355/77 |
| 4,922,273 | 1/1990 | Yonekawa et al. | 358/429 |
| 4,951,084 | 8/1990 | von Stein et al. | 355/38 |
| 5,016,043 | 5/1991 | Kraft et al. | 355/38 |
| 5,036,351 | 7/1941 | Frick et al. | 355/38 |

FOREIGN PATENT DOCUMENTS 312499 4/1989 European Pat. Off. .......... 355/35

Primary Examiner—L. T. Hix
Assistant Examiner—D. Rutledge
Attorney, Agent, or Firm—Burns, Doane, Swecker & Mathis

[57] ABSTRACT

In a photographic copy process the copy master is scanned in intervals by a source of measuring light. The measuring light is spectrally split, detected and converted into electrical measuring signals. The n spectral measuring signals are converted into n spectral density values, compared with neutral densities and n spectral density differences formed. In a data compression the n spectral density differences are converted by an orthogonal transformation to $m<n$ transformation coefficients. The transformation coefficients are analyzed in a color and density correction routine and deviations computed. From the deviations the copy light quantities and exposure corrections adjusted to the copy material are determined. The photographic copies are produced by the exposure values determined.

16 Claims, 7 Drawing Sheets

PROCESS FOR THE PREPARATION OF PHOTOGRAPHIC COLOR COPIES

BACKGROUND OF THE INVENTION

The present invention relates to a process for the preparation of photographic color copies from photographic copy masters in a photographic color copy apparatus.

Photographic color copies are, for example, prepared as paper images from photographic copy masters such as negative films of slides. However, it is normally not possible to work with standardized, uniform quantities of copying light in preparing these color copies. The copy masters are therefore analyzed in photographic copy apparatuses to determine color and density corrections. The corrections are determined from the analytical data, from which the necessary copy light quantities, in particular for the three primary colors of blue, green and red, may in turn be determined. In this manner, exposure errors in the production of the copy master may be compensated in the color copy. In addition to genuine false exposures, expressed by extremely under or overexposed copy masters, color tints due to unfavorable illumination (for example neon light) or the use of unsuitable or degraded film material, may also be compensated. The exposure control processes employed for this purpose are essentially based on two steps:

(a) The copy master is analyzed spectrally. The purpose of the analysis is on the one hand to distinguish the areas of the copy master essential for the image from those of lesser importance and on the other, to detect color tints due to the carrier material, unfavorable illumination, erroneous exposures, etc.

(b) In keeping with the analytical data, copy light quantities for the three primary colors blue, green and red are determined in order to compensate for color tints and to reproduce at least the areas important for the image of the copy master with the correct color and density.

An exposure control process of this type is described for example in EP-A-312 499. In this known process, the fundamental progression of which is shown in FIG. 2, the copy master is scanned in intervals, preferably point by point, and the measuring light of each scanning interval spectrally analyzed. From the spectral values f, color extract values a of the copy master adapted to the spectral sensitivity variation of the copy material are formed for the primary colors blue, green and red by electronic or computer filtering. By comparing these color extract values with reference densities d* (e.g., of a reference copy master), density deviations c* in the three primary colors blue, green and red are obtained. It should be noted that the reference densities d* are also determined on the basis of the spectral sensitivities of the copy material used.

The density deviations c* represent the input data for the color and density correction procedure D* proper. To be able to apply standardized correction routines, it is recommended to reduce the dependence of the density deviations on the copy material used prior to the procedure. For this, the density deviations c* are combined with a so-called paper matrix P. In the color and density correction procedure D*, correction values $^2$c are produced from the density deviations c* possibly subjected first to a transformation P. These correction values in an ideal case correspond to the deviations of the color densities of the copy master to be copied from those of a copy master of the same scene produced under optimum conditions. From the correction values $^2$c, the necessary copying light quantities and exposure times are determined for the primary colors of blue, green and red.

Subsequently, the copying light quantities and exposure times are adapted to the spectral sensitivities of the copy material used. For this, the output data of the color and density correction procedure D*, (i.e., the correction values $^2$c in the three primary colors blue, green and red), are combined with an exposure matrix B*, which cancels out the effect of the matrix P. Preferably, the exposure matrix B* corresponds to the inverse matrix of the paper matrix P. In actual practice, it is also used frequently to correct erroneous effects of the overall system.

While this known exposure control process compensates incorrect exposures and color tints in the color copy, it has a number of disadvantages. The evaluation of the spectral values of each scanning interval relative to the spectral sensitivity variation of the copy materials requires a special evaluating matrix S, a paper matrix P, and an exposure matrix B* for each of the copy materials used. Different color extract values a are thus obtained for the same scanning interval of the copy master, depending on the type of copy material used. The same is obviously true for the reference densities d*. For every copy material used new reference densities adapted to the prevailing spectral sensitivities must therefore be determined.

The density deviations resulting from the comparison of the aforementioned color extract values and the reference densities are also dependent on the sensitivity variation of the copy material used. In the extreme case this signifies that for each copy material used, a specific color and density correction procedure adapted to the material must be employed. For this reason, numerous attempts are made to reduce the copy material dependence of the density deviations, which represent the input data of the color and density correction routines, by combining them with a 3×3 paper matrix. While it is possible in this manner to work with only one standardized routine, a specific paper matrix P and a corresponding exposure matrix B* must be determined for each copy material used. Even in this fashion the input data and the standardized color and density correction routine cannot be optimally reconciled for every copy material, which in turn may lead to the determination of less than optimal or even incorrect copy light quantities.

There is therefore an urgent demand for the alteration and improvement of a process for the preparation of photographic color copies from a photographic copy master, whereby the aforementioned disadvantages are eliminated. The process should be simple and applicable to any customary type of copy material.

SUMMARY OF THE INVENTION

The foregoing and other objects are attained by a process for the preparation of photographic color copies from a photographic copy master in a photographic color copying apparatus in accordance with the present invention. A preferred process for preparing the photographic color copies includes scanning the copy master in a measuring station of the photographic color copy apparatus in intervals; conducting the measuring light received from each scanning region to a detector layout; spectrally splitting and converting the measuring light into wavelength and intensity dependent electrical measuring signals; digitizing the electrical measuring signals and conducting the digital signals to a computer and evaluating unit; evaluating the electrical signal to determine quantities of copy light required in primary colors of blue, green and red; converting the spectral measuring signals of every scanning region of the copy master into spectral density values; comparing the spectral density values with spectral reference densities and forming n spectral density differences; subjecting the spectral density differences to data compression, whereby the original n density differences are converted by an orthogonal transformation into m transformation coefficients where $m<n$; selecting transformation coefficients from among the m transformation coefficients such that the n density differences may be reconstructed within a predetermined accuracy criterion, said selected transformation coefficients being used as input data for determining color and density correction deviations; evaluating the deviations relative to spectral sensitivities of the copy material and determining necessary copy light quantities and exposure corrections; converting the copy light quantities and exposure corrections for the copy master into control signals and transmitting the control signals to an exposure station; and exposing the copy material for the production of color copies of the copy master.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

Figure 1:
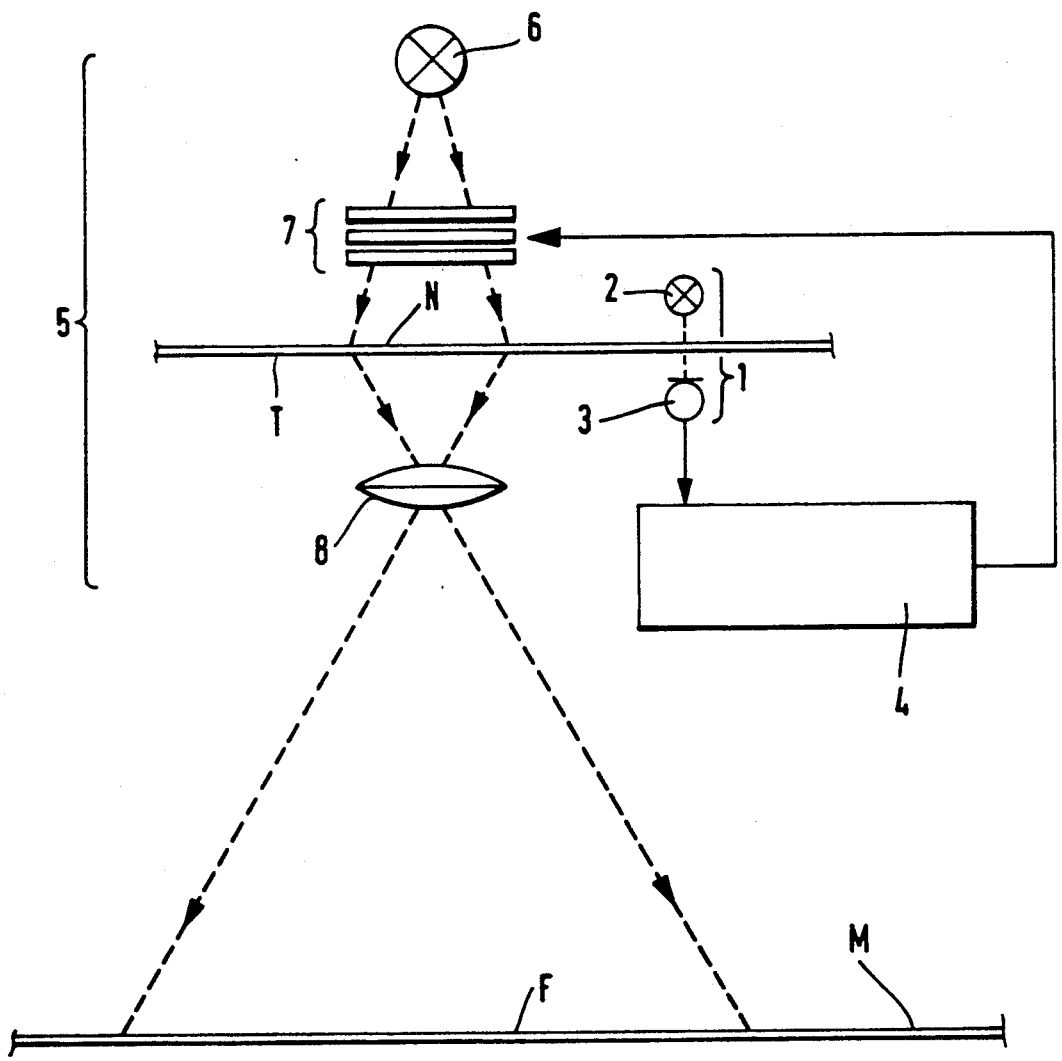
FIG. 1 is a schematic view of a color copying apparatus.

The photographic color copying apparatus schematically shown in FIG. 1 corresponds in its configuration to an apparatus described in EP-A-312 499. It comprises essentially a measuring station 1, a computer and evaluating unit 4 and an exposure station 5. The measuring station contains a source 2 of measuring light and a detector layout 3. The detector layout 3 has a configuration such that on the one hand it spectrally splits the light coming from a scanning region of a copy master N, and on the other, it detects the individual spectral components and converts them into wavelength and intensity dependent electrical measuring signals. The spectral splitting of the measuring light is effected for example by a prism, a diffraction grid or a spectral filter. The individual spectral components are detected by an electrooptical transducer, in particular a CCD image sensor (Charge-Coupled-Device) and converted. The opto-electrical transducer is connected with the computer and evaluating unit 4 in order to transmit the measuring signals.

The exposure station 5 is also connected with the computer and evaluating unit 4. The exposure station essentially comprises a copy light source 6, a set of servocontrolled color shutters and an imaging optic 8 to project the copy master N onto the copy material M to produce the photographic copy F.

The photographic copy master N is scanned in intervals, preferably point by point, in the measuring station 1 of the photographic color copy apparatus by the light beam of the source 2 of measuring light. The measuring light transmitted or reflected by each scanned region of the copy master N is conducted to the detector layout 3, spectrally split and converted into wavelength and intensity dependent electrical measuring signals. The electrical measuring signals are digitized and passed on to the computer and evaluating unit 4, wherein they are evaluated to determine the quantities of copying light required, in particular the logarithmic exposure control for the primary colors of blue, green and red. Copy light alterations determined for the entire copy apparatus relative to the three primary colors blue, green and red are converted into control signals and transmitted to the exposure station 5. In the exposure station the copy light source 6 and the servocontrolled color shutters 7 are controlled using these control signals so as to expose a photographic color copy F of the copy master N on the copy material M.

Figure 2:
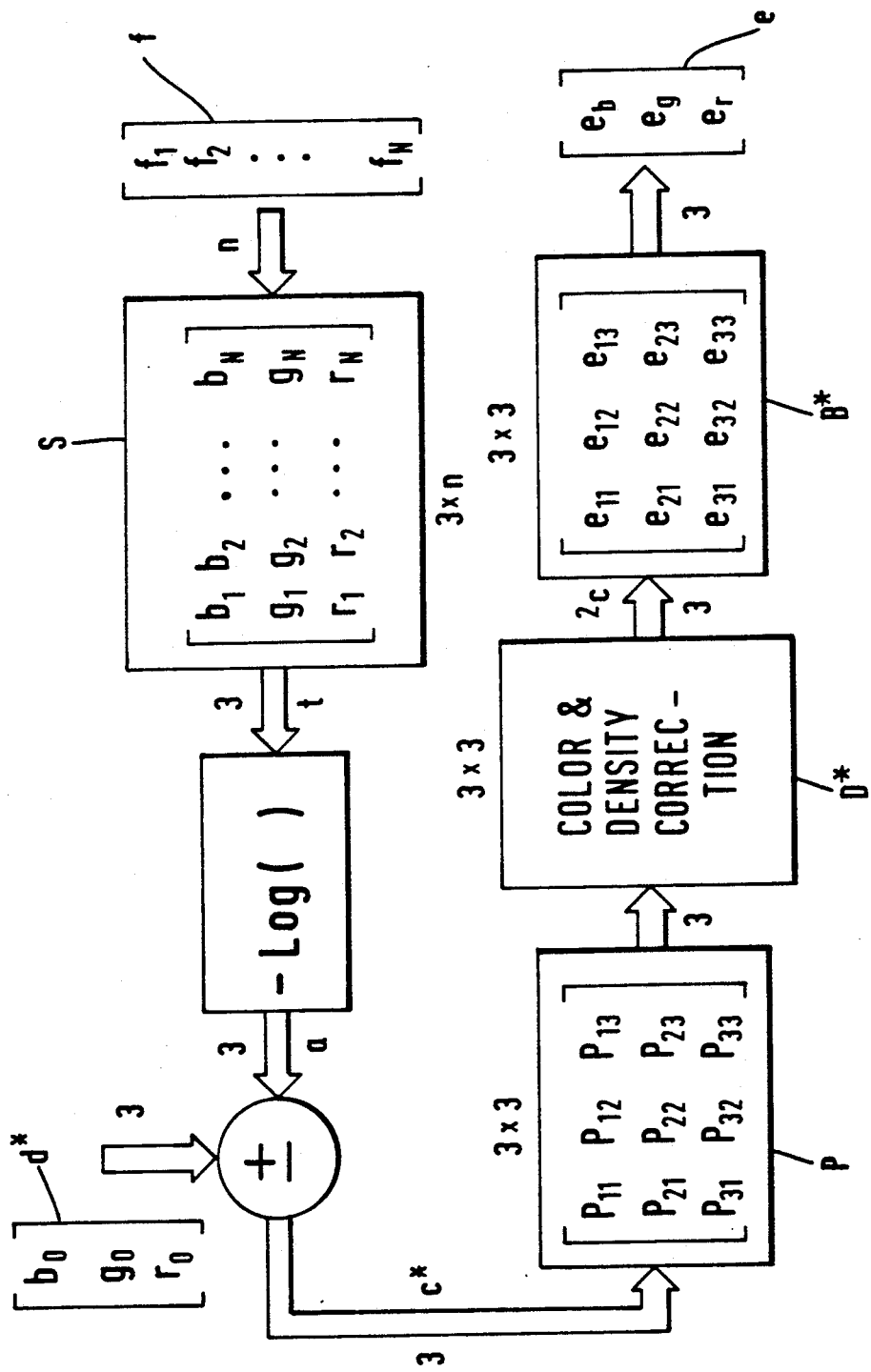
FIG. 2 shows a process diagram of a known exposure control process.

The exposure control process known from EP-A-312 499 for the evaluation of measuring signals and the determination of the quantities of copy light and exposure times required for the three primary colors blue, green and red has been explained with reference to the process diagram shown in FIG. 2. Here the sensitivity matrix S represents the sensitivity of the copy material M relative to the wavelength wherein the spectral variation of the measuring light originating in the scanning interval of the copy master N is determined. The paper matrix P serves to reduce the dependence of the measured values on the sensitivity of the copy material used. The matrix P is determined, for example, by linear regression from two sets of measured values originating in the same areas of the master. The two sets of measured values are measured once with the sensitivity of a reference copy material and once with another, new copy material product. The exposure matrix B* is determined based on the paper matrix P. Ideally, the exposure matrix B* represents the inverse matrix of the paper matrix P.

Figure 3:
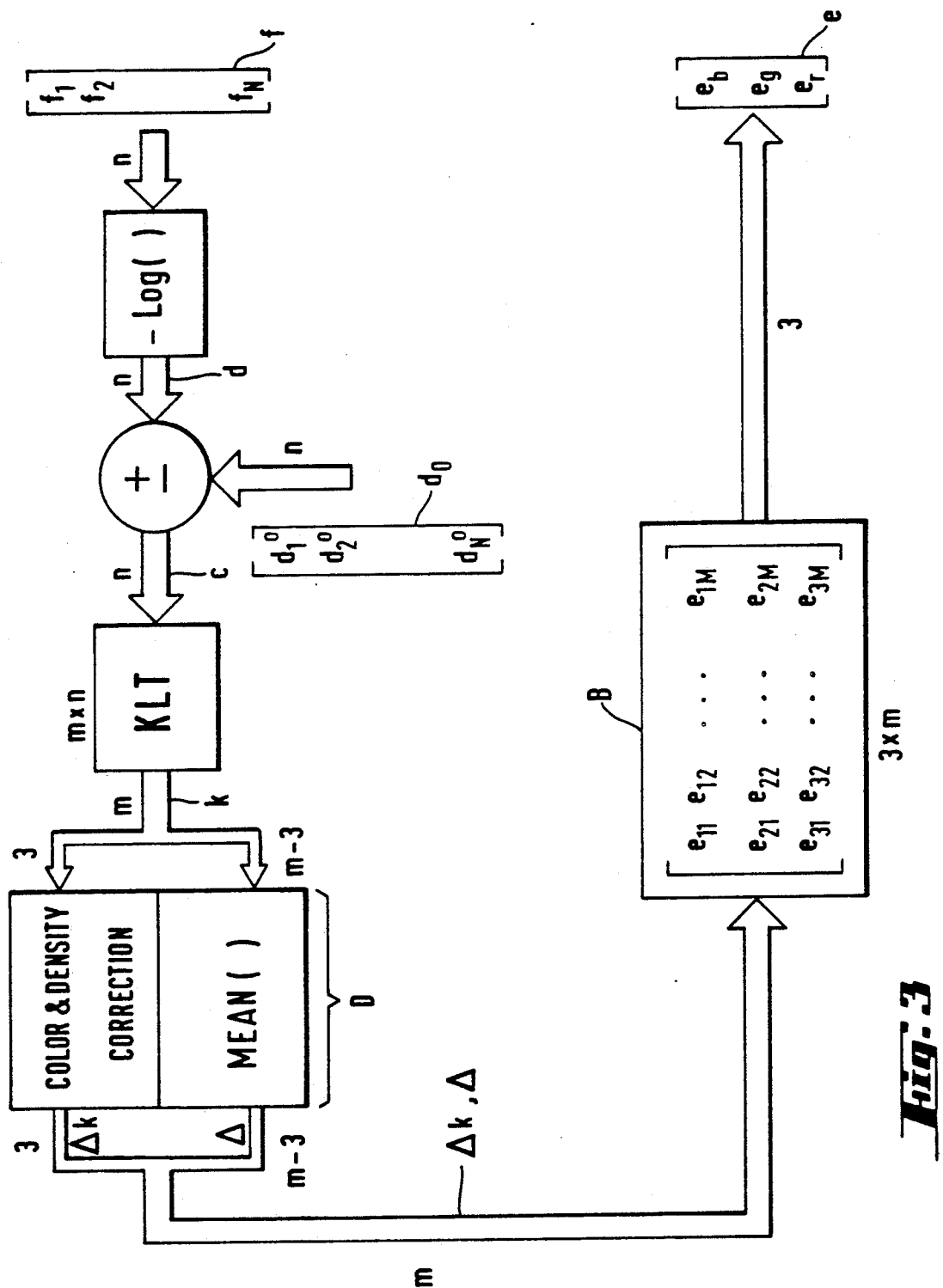
FIG. 3 shows a process diagram of the exposure control diagram of an exemplary copying process according to the invention.

A process according to the invention differs from the aforementioned known process by the mode of evaluating the measured signals to determine the necessary copy light quantities and exposure corrections e. An exemplary fundamental process diagram of the present invention is shown in FIG. 3. In contrast to the known process, the n spectral measured signals f of each scanning interval (these correspond to the spectral transmissions and reflections of the scanning interval involved) are logarithmically converted into n spectral density values d, without first evaluating them relative to the spectral sensitivities of the copy material M. These n spectral density values d are then compared with the reference densities $d_o$ of a standard copy master and combined into n spectral density differences c.

The spectral reference densities $d_o$ may be determined by the analysis of a neutral gray standard copy master. Preferably, however, they are determined by averaging the measured spectral density values d of a plurality of copy masters N. The reference densities $d_o$ may also be equal to zero. It is further possible to continuously adapt the spectral reference density values determined in this manner, simply by including the spectral density values d of additional prevailing copy masters in the averaging. It is understood that in the determination of the spectral reference densities d, there is again no evaluation adapted to the spectral sensitivities of the copy material M.

Prior to the color and density correction proper, the n density differences c are subjected to a data compression. In the process, from the original n density differences c, m<n transformation coefficients k are obtained by orthogonal transformation. The resulting m transformation coefficients k are obviously still independent of the spectral sensitivities of the copy material M used.

The orthogonal transformation used in the data compression may be for example a Discrete Cosine Transformation or a Discrete Fourier Transformation, such as described for example by N. Ahmed and K. R. Rao in Orthogonal Transforms for Digital Signal Processing, Springer Verlag (Press) Berlin-Heidelberg-New York 1975 (Library of Congress Catalog Card No. 73-18912), the disclosure of which is hereby incorporated by reference in its entirety.

The data compression or data reduction is obtained by selecting from the complete set of n base vectors the m vectors that are most relevant for the characterization of the density differences c. If the variance of the transformation coefficient k is used as the selection criterion, by taking into account only the m transformation coefficient with the highest variance, the density differences c may be reconstructed using an inverse transformation with the least mean square error. The inverse matrix here represents the transposed n×m matrix of the original orthogonal transformation matrix.

However, the optimum transformation in the sense of the mean square reconstruction error is represented by the so-called Karhunen-Loève transformation, also described in the aforecited publication by N. Ahmed and K. R. Rao. In the Karhunen-Loève transformation, the vector of the spectral density differences c is again multiplied by an m×n transformation matrix, the Karhenen-Loève transformation matrix KLT. The Karhunen-Loève transformation matrix KLT is formed by m orthonormal line vectors with n components each.

In contrast to the aforementioned "problem independent" transformations, the Karhunen-Loève transformation is problem adapted. The base vectors of the KLT transformation matrix are dependent on the statistical properties of the measure data to be transformed. They are defined as the proper vectors of the covariance matrix (determined over a plurality of measured data) of the density difference c. of these n base vectors again only the m vectors with the highest variance of the corresponding transformation coefficient k are considered. The base vectors selected simultaneously represent the proper vectors correlated with the m highest proper values. The covariance matrix and thus the transformation matrix is, for example, directly determined in the computer and evaluating unit 4 by evaluating an adequately high number of measured master density spectra. It is possible in this manner to simply readjust the transformation matrix periodically to the instantaneous statistic properties of the copy masters used.

Of the m selected transformation coefficients k, preferably the three coefficients with the highest variance have a particular role. These three coefficients are used as the input data for the color and density correction procedure. The three coefficients selected are thus treated in a manner similar to the color extract values in the three primary colors blue, green and red in the known processes.

The remaining m−3 transformation coefficients represent minor deviations of the spectral densities of every scanning region of the copy master N from the neutral densities d and are averaged over the entire copy master N or over several copy masters. From these average deviations Δ and from the deviations Δk calculated from the color and density correction procedure D, the logarithmic exposure corrections e are subsequently calculated. In the process, the deviations are multiplied by a 3×m exposure matrix B. Using the exposure matrix B, the deviations are adapted to the different copy material products The exposure matrix B is determined, for example, by iteration wherein it is varied until test copy masters of a gray table yield copies as identical as possible, independently of the master material used and the degree of exposure.

Figure 4:
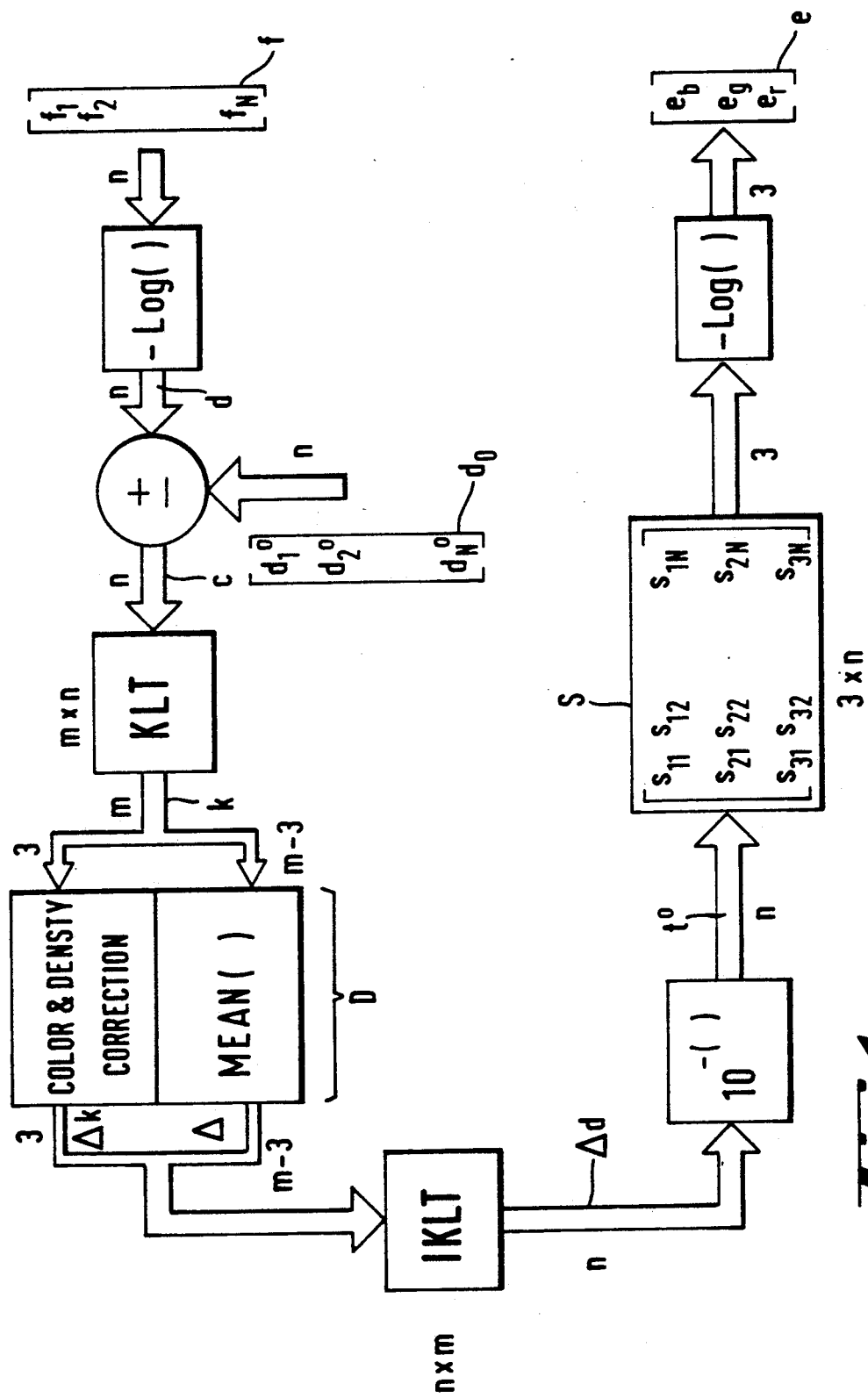
FIGS. 4 and 5 show two variants of the exposure control diagram of an exemplary copying process according to the invention.

In the process variant shown in FIG. 4, the three deviations Δk and the m−3 average deviations Δ are converted by using the inverse Karhunen-Loève transformation IKLT into n density correction values Δ, prior to their use in determinating the necessary copying light quantities and exposure corrections for the three primary colors blue, green and red. Following an inverse logarithm, n transmission values $t^0$ are obtained. The adaptation to the spectral sensitivities of the copy material M used is effected by a combination of these transmission values $t_0$ with a 3×n sensitivity matrix S. The latter again describes the spectral sensitivities of the copy material M and the three color layers contained in the copy material M. The necessary logarithmic exposure correction e for the three primary colors blue, green and red is obtained by again using a logarithm of the three values resulting from the combination.

Figure 5:
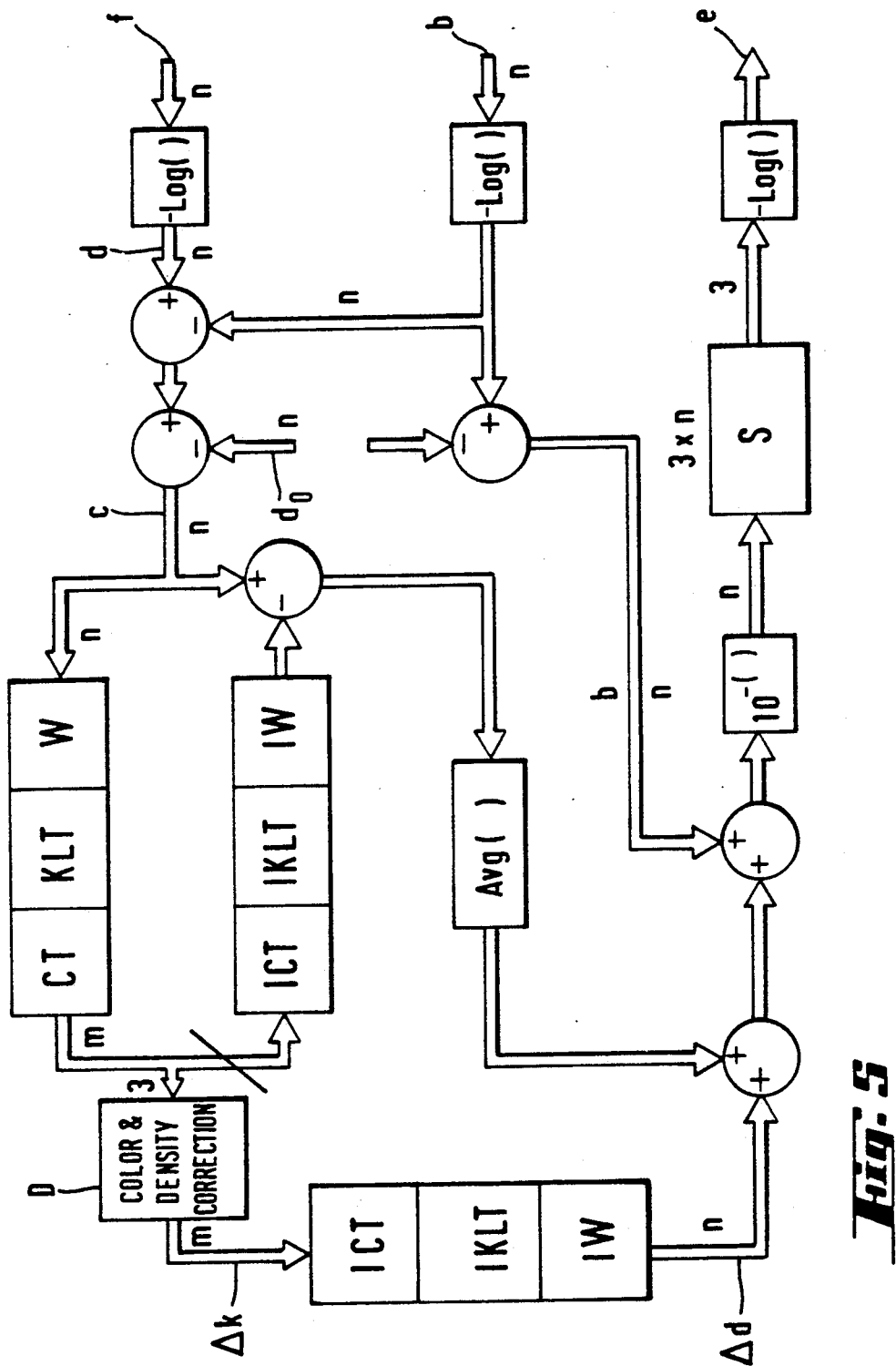
Figure 6:
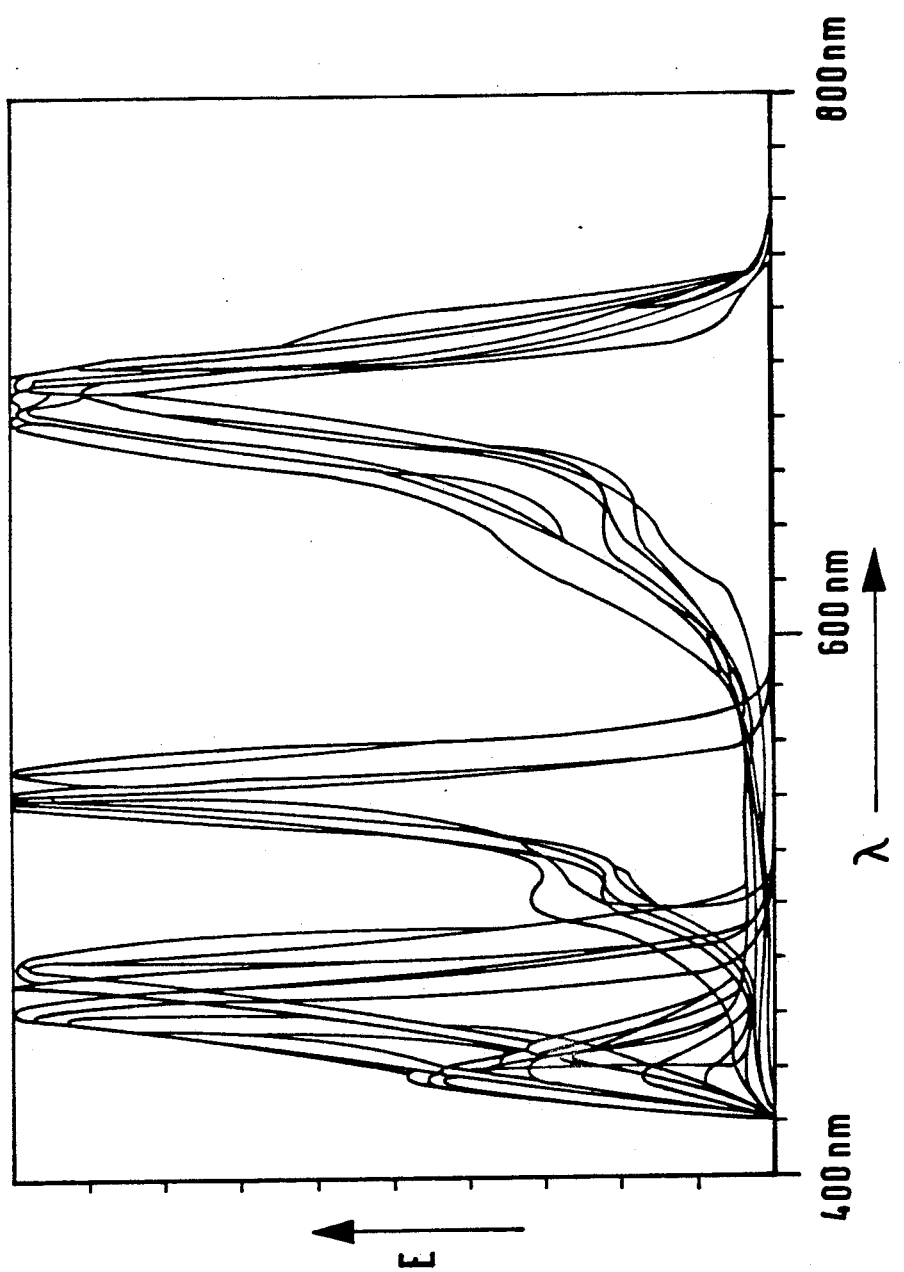
FIG. 6 shows spectral sensitivities of different copy materials.
Figure 7:
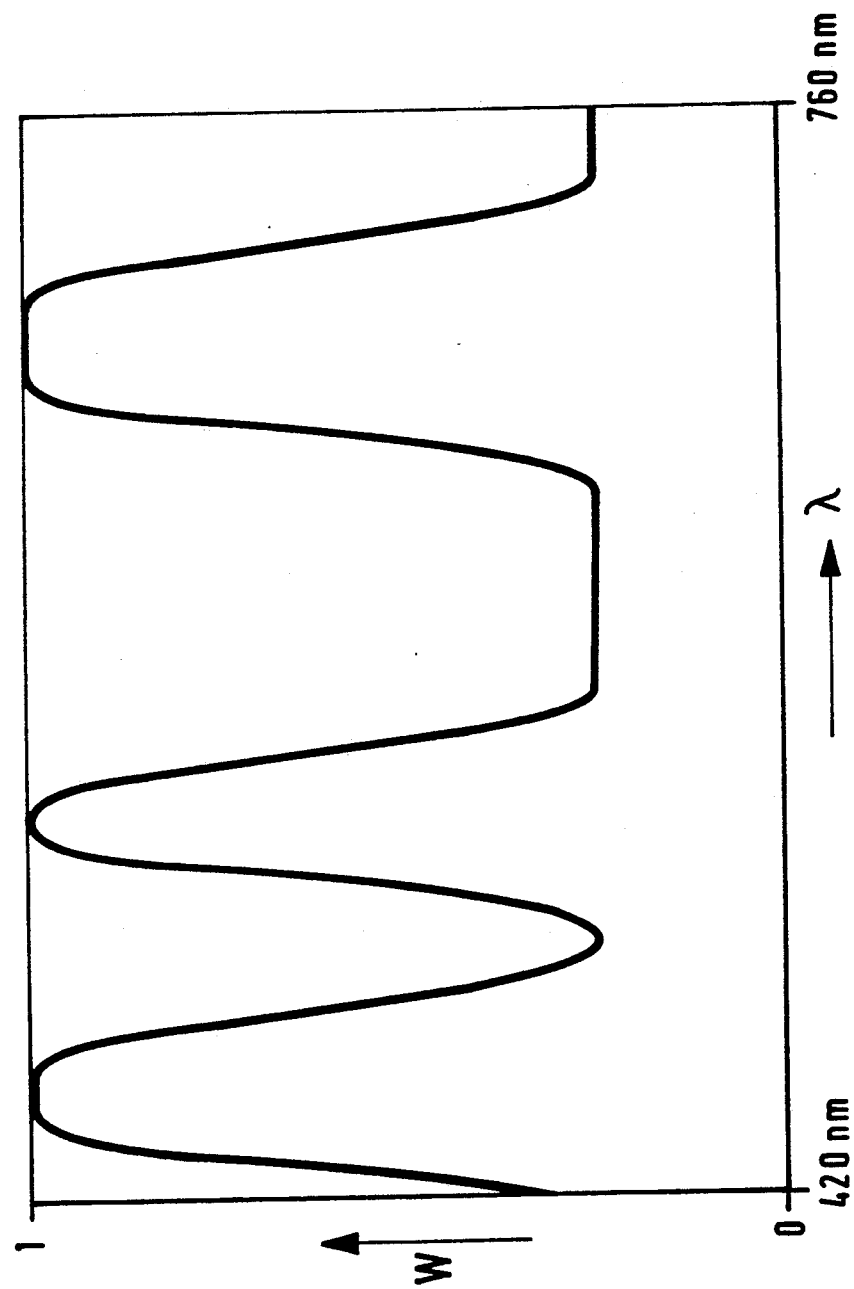
FIG. 7 shows an example of a weighting function.

In the process variant shown in FIG. 5, so-called hazing densities (in the case of a negative film the so-called masking densities) b are determined from the master material T. This is carried out for example by measuring an area of the master between two copy masters N, in the case of a negative film for example on the web of the film. These hazing densities b are deducted from the spectral densities d measured for each scanning area, prior to the determination of the spectral density differences c. Prior to their combination with the sensitivity matrix S, the master densities b are again added to the n density correction values. The spectral density differences c are preferably weighted prior to their transformation with an inverse weighting function W, wherein following the application of the inverse Karhunen-Loève transformation IKLT, the density correction values are again combined with the inverse weighting function IW. The weighting function W is preferably chosen so that it assigns the greatest weight to the spectral density differences c in the spectral areas in which the spectral sensitivities of the copy material M are the highest. In FIGS. 6 and 7 the spectral sensitivity variations of different copy materials M and a mean weighting function W are shown as examples.

If the three transformation coefficients k determined and weighted in this manner still do not satisfy the boundary conditions for the application of already existing color and density correction routines, (e.g., the orders of magnitude of the coefficients do not correspond to the color extract values otherwise used in the known processes), the transformation coefficients k may be first adjusted. For example, as indicated in FIG. 5, the coefficients k can be adjusted with a reversible color transformation CT; i.e., their signal level may be adapted. However, immediately following the color and density correction, the color and density corrected transformation coefficients Δk must be combined with the reversing function ICT in order to reverse this artificial adjustment.

In the process according to the invention the analytical values and the correction values for the color and density of the copy to be produced are independent of the spectral sensitivities of the copy material used. Only immediately before or during the determination proper of the copy light quantities and exposure times required are the correction values evaluated relative to the spectral sensitivities of the copy material. In this manner, only one set of analytical data and correction values is obtained, independently of the copy material used. A single set of reference values i also sufficient. By the orthogonal transformation of the analytical data, the number of spectral values may then be reduced.

From the transformation coefficients determined in this manner a set of coefficients can be selected which essentially correspond to the conventionally determined color extract values for the primary colors blue, green and red. In contrast to the color extract values, the coefficients selected, (in particular the case of the Karhunen-Loève transformation) are uncorrelated and describe the density spectrum of the scanned areas of the copy masters over the entire spectral range used with the utmost accuracy. By additional weighting and signal and data adaptation, the process may be applied together with existing color and density correction routines.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the preparation of photographic color copies of a photographic color copy master, comprising the steps of:

scanning the copy master in a measuring station of the photographic color copy apparatus in intervals;
    conducting measuring light received from each scanning region to a detector layout;
    spectrally splitting and converting the measuring light into wavelength and intensity dependent spectral measuring signals;
    converting the spectral measuring signals of every scanning region of the copy master into spectral density values;
    comparing the spectral density values with spectral reference densities and forming n spectral density differences;
    subjecting the spectral density differences to data compression, whereby the n density differences are converted by an orthogonal transformation into m transformation coefficients where $m < n$;
    selecting transformation coefficients from among the m transformation coefficients such that the n density differences may be reconstructed within a predetermined accuracy criterion, said selected transformation coefficients being used as input data for determining color and density correction deviations;
    evaluating the deviations relative to spectral sensitivities of the copy material and determining necessary copy light quantities and exposure corrections;
    converting the copy light quantities and exposure corrections for the copy master into control signals and transmitting the control signals to an exposure station; and
    exposing the copy material for the production of color copies of the copy master.

2. Process according to claim 1, further comprising the steps of:

selecting from the m transformation coefficients, three transformation coefficients m having the highest variance as the input data for the color and density correction; and
    choosing the least mean square reconstruction error as the accuracy criterion.

3. Process according to claim 2, further comprising the steps of:

averaging the $m-3$ transformation coefficients not selected over the entire copy master; and
    using the $m-3$ coefficients to determine the copy light quantities and exposure corrections required.

4. Process according to claim 3, further comprising the steps of:

using a reversible transformation matrix formed of m lines of vectors with n components for the orthogonal transformation.

5. Process according to claim 4, wherein said reversible transformation matrix is a Karhunen-Loève transformation matrix having m real and orthonormal line vectors which form the base vectors of the transformation matrix.

6. Process according to claim 5, further comprising a step of:

determining vectors of a covariance matrix of the density differences from a plurality of different copy masters for use as the base vectors of the Karhunen-Loève transformation matrix.

7. Process according to claim 6, further comprising the step of:

retransforming the correction deviations using an inverse Karhunen-Loève transformation into n density correction values; and
    evaluating the density correction values to determine the copy light quantities and exposure corrections required for primary colors of blue, green and red.

8. Process according to claim 7, further comprising the step of:

combining the n density correction values with a $3 \times n$ sensitivity matrix describing spectral sensitivities of the copy material to adjust the copy light quantities and exposure corrections for the primary colors blue, green and red to the copy material.

9. Process according to claim 8, further comprising the steps of:

determining haze densities of the master material from the spectral density values prior to the determination of the spectral density differences; and adding the haze densities to the density correction values prior to their combination with the sensitivity matrix of the copy material.

10. Process according to claim 9, further comprising the steps of:
combining the spectral density differences prior to their transformation with a reversible weighting function; and
combining the density correction values with a function inverse to said weighting function prior to combination of said density correction values with the sensitivity matrix of the copy material.

11. Process according to claim 10, further comprising the step of:
assigning the heaviest weighting to spectral density differences in spectral regions wherein the spectral sensitivities of the copy material ar highest.

12. Process according to claim 11, further comprising the steps of:
adjusting the transformation coefficients used for color and density correction with a reversible color transformation by adapting their order of magnitude or signal level to the orders of magnitude or signal level of selected color and density correction routines; and
reversing said adaptation by combining the corrected color and density transformation coefficients with a reversing function 13. Process according to claim 12, further comprising the steps of:
determining the spectral reference densities by averaging measured spectral density values of a plurality of copy masters; and
continuously adjusting the spectral reference densities.

14. Process according to claim 1, wherein necessary copy light quantities and exposure corrections are determined for the primary colors of blue, green and red.

15. Process according to claim 1, wherein said measuring light is transmitted by each scanning region.

16. Process according to claim 1, wherein said measuring light is reflected by each scanning region.

* * * * *